(12) United States Patent
Isaac et al.

(10) Patent No.: US 8,602,347 B2
(45) Date of Patent: Dec. 10, 2013

(54) TILT ROTOR AIRCRAFT WITH FIXED ENGINE ARRANGEMENT

(75) Inventors: Mark L. Isaac, Fort Worth, TX (US); David A. Elliott, Azle, TX (US); Brent C. Ross, Haslet, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/357,981

(22) Filed: Jan. 25, 2012

(65) Prior Publication Data
US 2012/0199699 A1     Aug. 9, 2012

Related U.S. Application Data

(60) Provisional application No. 61/439,547, filed on Feb. 4, 2011.

(51) Int. Cl.
*B64C 27/22*     (2006.01)

(52) U.S. Cl.
USPC ........................................ 244/7 A; 244/23 B

(58) Field of Classification Search
USPC ............ 244/7.11, 23 B, 7 R, 7 A, 56, 66, 661
See application file for complete search history.

(56) References Cited

U.S. PATENT DOCUMENTS

| | | | | |
|---|---|---|---|---|
| 2,974,900 A | * | 3/1961 | Morris et al. | 244/12.4 |
| 3,284,027 A | * | 11/1966 | Mesniere | 244/12.4 |
| 3,586,262 A | * | 6/1971 | Sherman | 244/7 R |
| 3,592,412 A | * | 7/1971 | Glatfelter | 244/7 A |
| 4,979,698 A | * | 12/1990 | Lederman | 244/7 R |
| 5,823,470 A | * | 10/1998 | Craig et al. | 244/7 R |
| 6,276,633 B1 | * | 8/2001 | Balayn et al. | 244/56 |
| 6,607,161 B1 | * | 8/2003 | Krysinski et al. | 244/7 A |
| 2006/0016930 A1 | | 1/2006 | Pak | |

FOREIGN PATENT DOCUMENTS

EP     1057724 A2     12/2000

OTHER PUBLICATIONS

Extended European Search Report from related European Application No. 121533373.1, dated Jun. 15, 2012, 8 pages.
Examination Report in related European patent application No. 12153373.1, mailed Aug. 9, 2013, 4 pages.

* cited by examiner

*Primary Examiner* — Tien Dinh
*Assistant Examiner* — Keith L Dixon
(74) *Attorney, Agent, or Firm* — James E. Walton; J. Oliver Williams

(57) ABSTRACT

The system of the present application includes an engine and pylon arrangement for a tilt rotor aircraft in which the engine is fixed in relation to a wing portion of the aircraft, while the pylon is rotatable. The pylon supports a rotor hub having a plurality of rotor blades. Rotation of the pylon allows the aircraft to selectively fly in a helicopter mode and an airplane mode, as well as any combination thereof.

18 Claims, 10 Drawing Sheets

TILT ROTOR AIRCRAFT WITH FIXED ENGINE ARRANGEMENT

BACKGROUND

1. Technical Field

The present application relates to an engine and pylon configuration for a tilt rotor aircraft.

2. Description of Related Art

A typical tilt rotor aircraft has wing mounted rotatable nacelles, each nacelle having an engine and rotor hub. The nacelles are selectively rotated between a helicopter mode and an airplane mode. During the helicopter mode, the nacelles are rotated to an approximate vertical position so that the tilt rotor aircraft can hover similar to a conventional helicopter. During the airplane mode, the nacelles are rotated to an approximate horizontal position so that the tilt rotor aircraft can fly similar to a fixed wing aircraft. Because the engine is located in the nacelle, the engine must be configured and certified to operate not only in a horizontal orientation, but also a vertical orientation, thus limiting engine choices. Further, a rotating engine typically requires more maintenance than a fixed engine. Even further, a rotating engine typically requires complex engine mounting structure, thus limiting maintenance/inspection access around the engine.

Hence there is a need for an improved engine and pylon configuration for a tilt rotor aircraft.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application includes an engine and pylon arrangement for a tilt rotor aircraft in which the engine is fixed in relation to a wing portion of the aircraft, while the pylon is rotatable. The pylon supports a rotor hub having a plurality of rotor blades. Rotation of the pylon allows the aircraft to selectively fly in a helicopter mode and an airplane mode, as well as any combination thereof.

Figure 1:
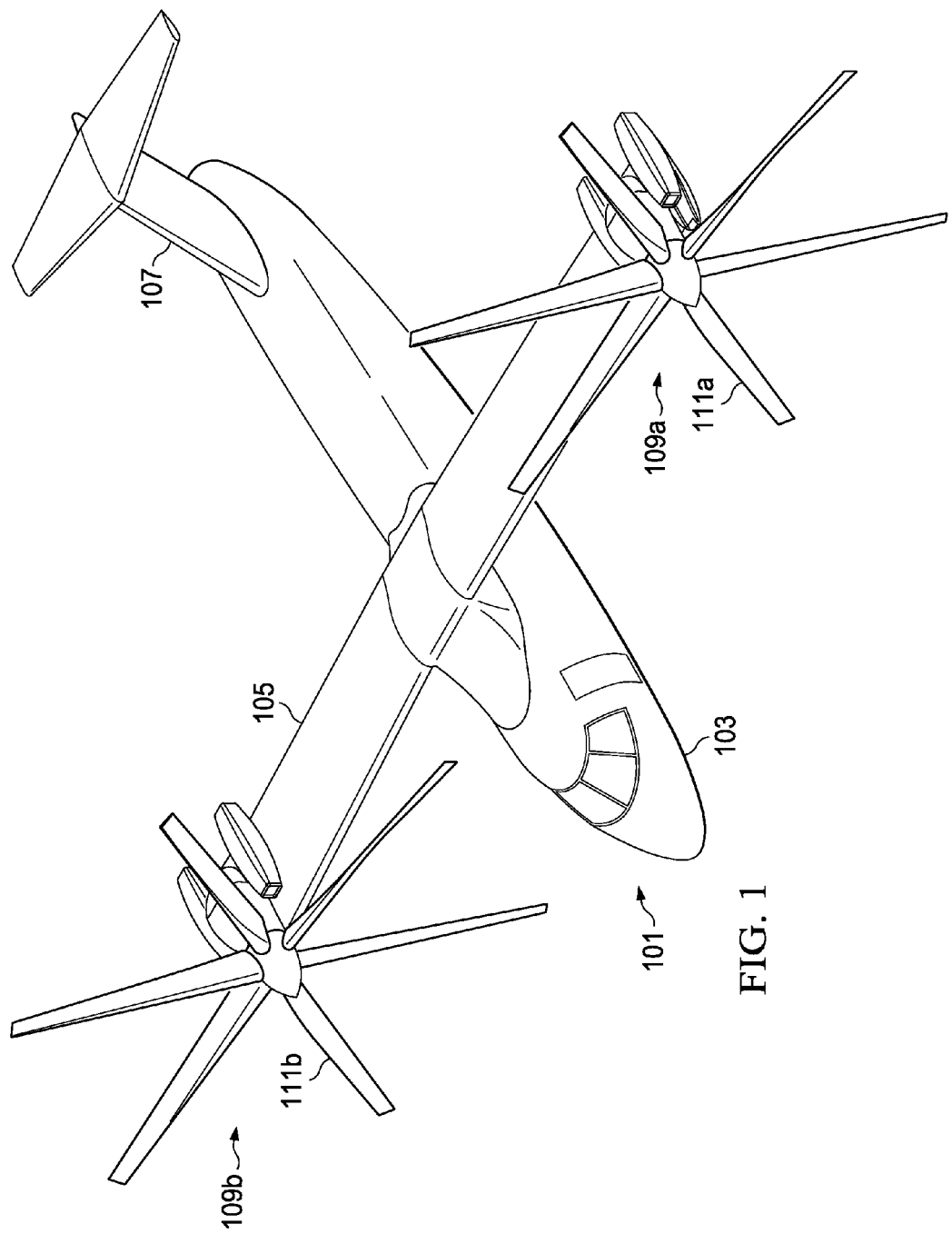
FIG. 1 is a perspective view of a tilt rotor aircraft, according to the preferred embodiment of the present application.

Referring to FIG. 1, a tilt rotor aircraft 101 is illustrated. In the illustrated embodiment, tilt rotor aircraft 101 includes a fuselage 103, a wing member 105, and a tail member 107. Aircraft 101 further includes a first rotor system 109a and a second rotor system 109b. First rotor system 109a is located on a left end portion of wing member 105, while second rotor system 109b is located on a right end portion of wing member 105. First rotor system 109a and second rotor system 109b are substantially symmetric of each other. In the interest of clarity, only first rotor system 109a will be discussed in detail. However, one of ordinary skill in the art will understand that the form and function of second rotor system 109b will be fully known from the benefit of the disclosure herein related to first rotor system 109a. Furthermore, first rotor system 109a and second rotor system 109b each include rotor blades 111a and 111b, respectively. However, in the interest of clarity, rotor blades 111a and 111b are omitted from some drawing views.

It should be appreciated that even though first rotor system 109a and second rotor system 109b are illustrated on tilt rotor aircraft 101, first rotor system 109a and second rotor system 109b can be implemented on other tilt rotor aircraft. For example, an alternative embodiment can include a quad tilt rotor aircraft that has an additional wing member located aft of wing member 105, the additional wing member can have additional rotor systems similar to first rotor system 109a and second rotor system 109b. Another alternative embodiment can include an unmanned version of tilt rotor aircraft 101. Further, first rotor system 109a and second rotor system 109b can be integrated into a variety of tilt rotor aircraft configurations.

Figure 2:
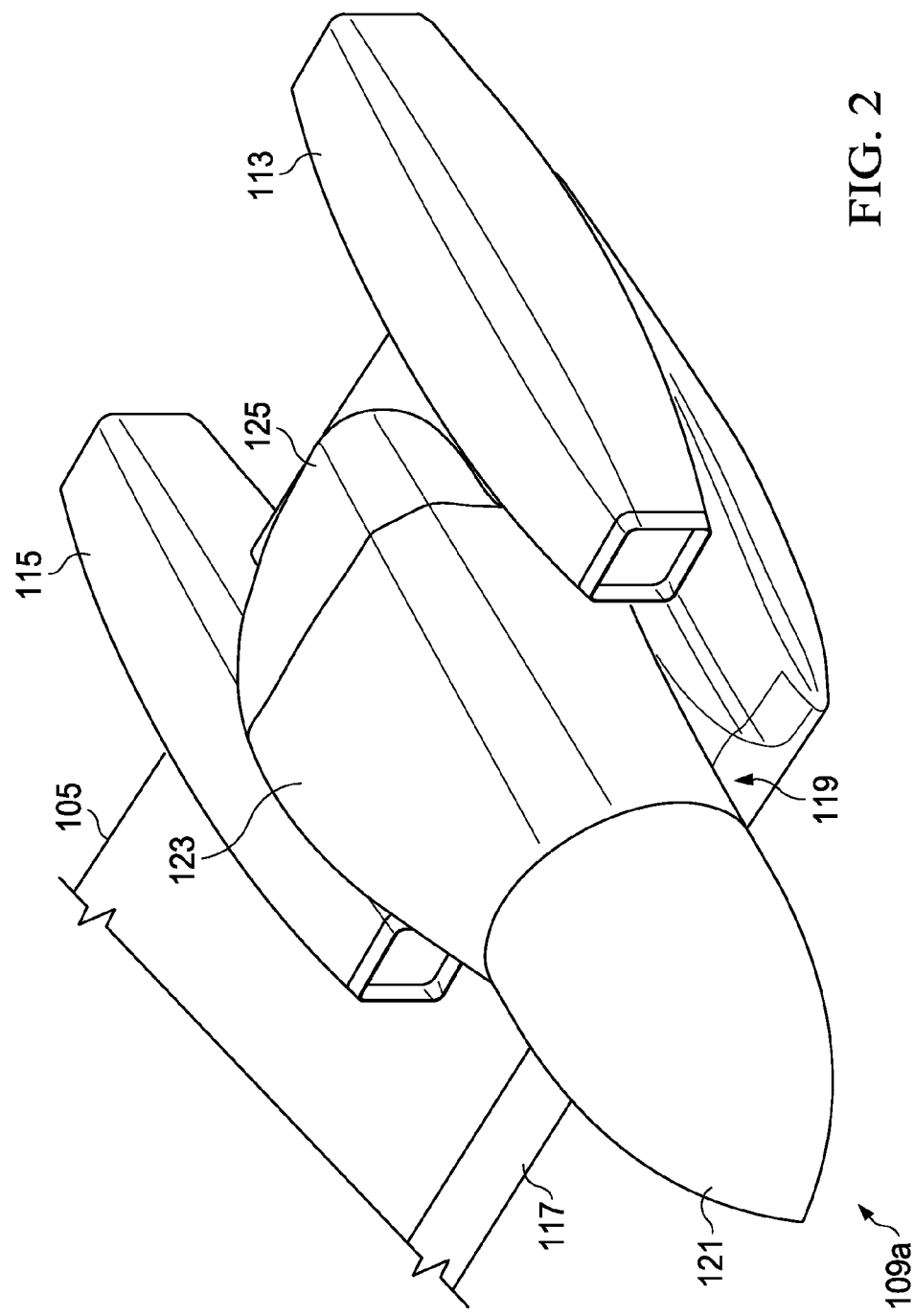
FIG. 2 is a perspective view of the rotor system, according to the preferred embodiment of the present application.
Figure 3:
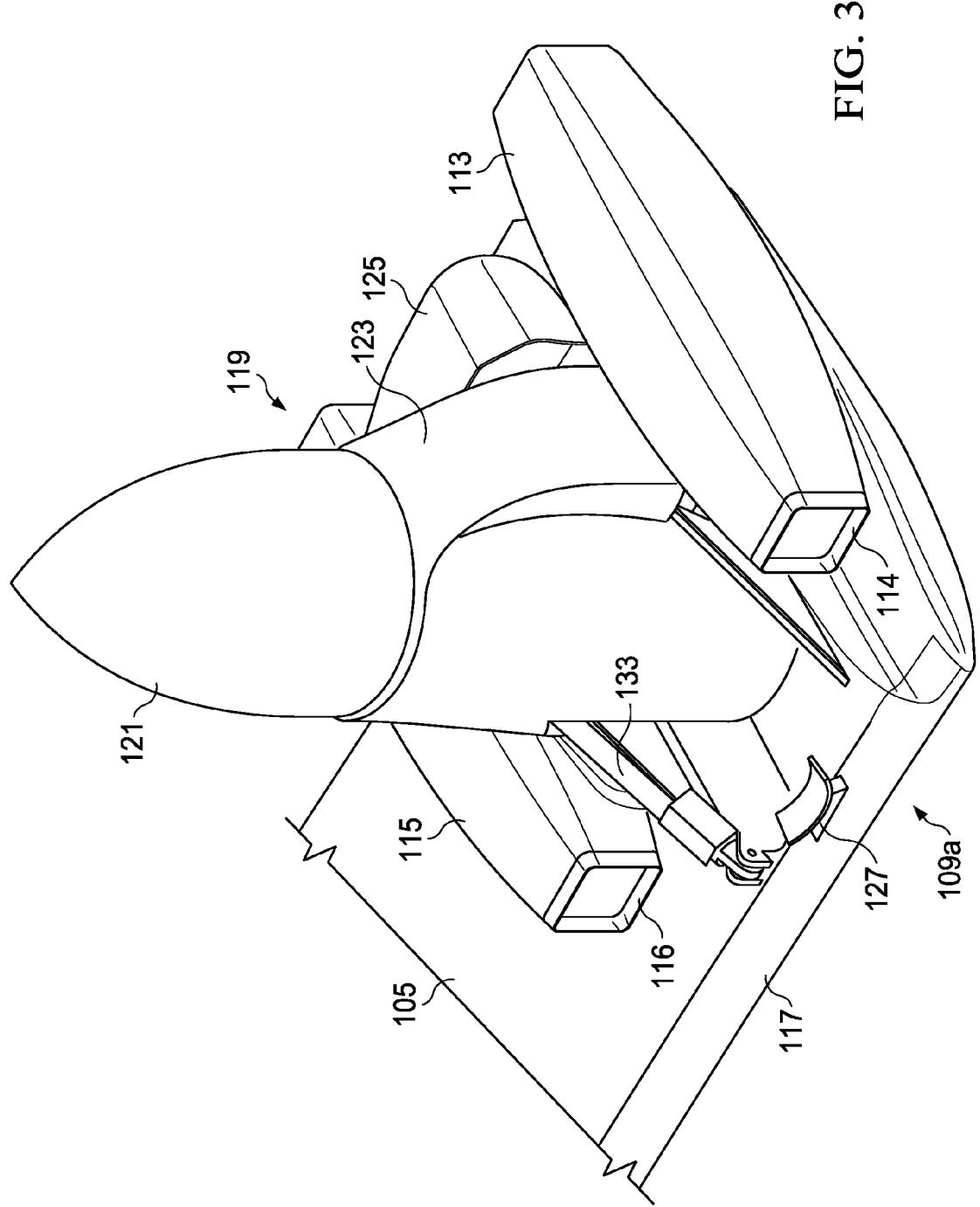
FIG. 3 is a perspective view of the rotor system, according to the preferred embodiment of the present application.
Figure 4:
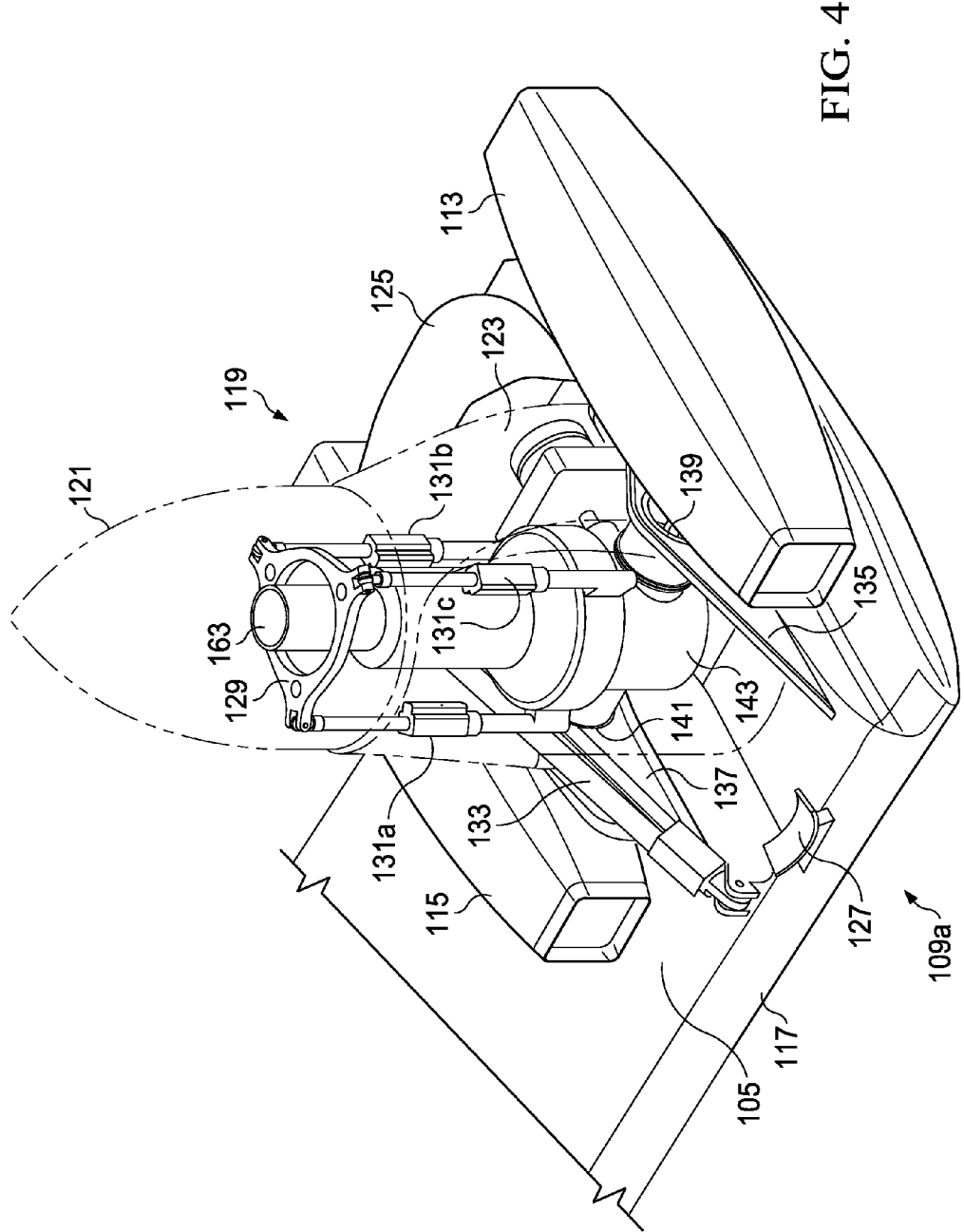
FIG. 4 is a perspective view of the rotor system, according to the preferred embodiment of the present application.
Figure 5:
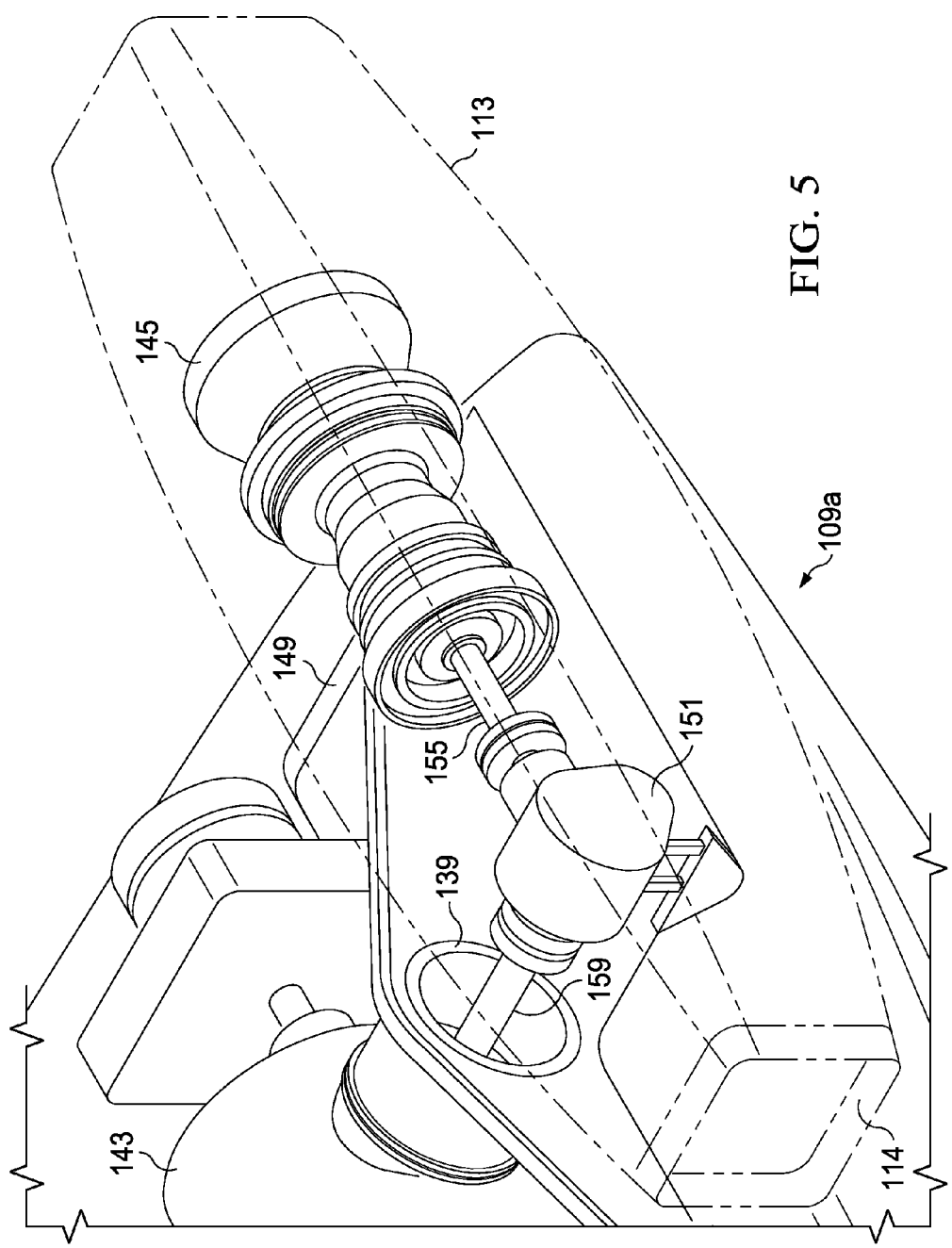
FIG. 5 is a partial perspective view of the rotor system, according to the preferred embodiment of the present application.
Figure 6:
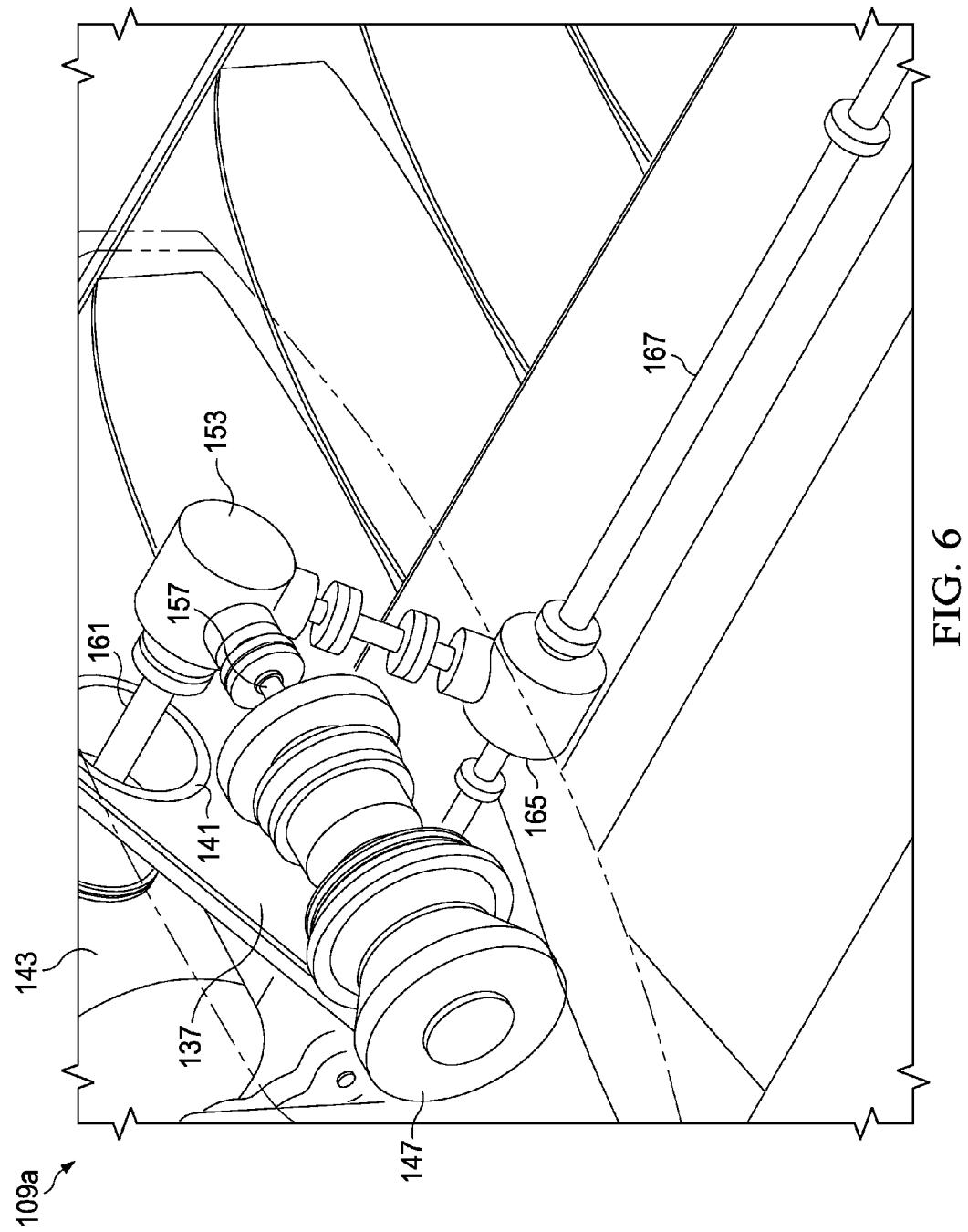
FIG. 6 is a partial perspective view of the rotor system, according to the preferred embodiment of the present application.
Figure 7:
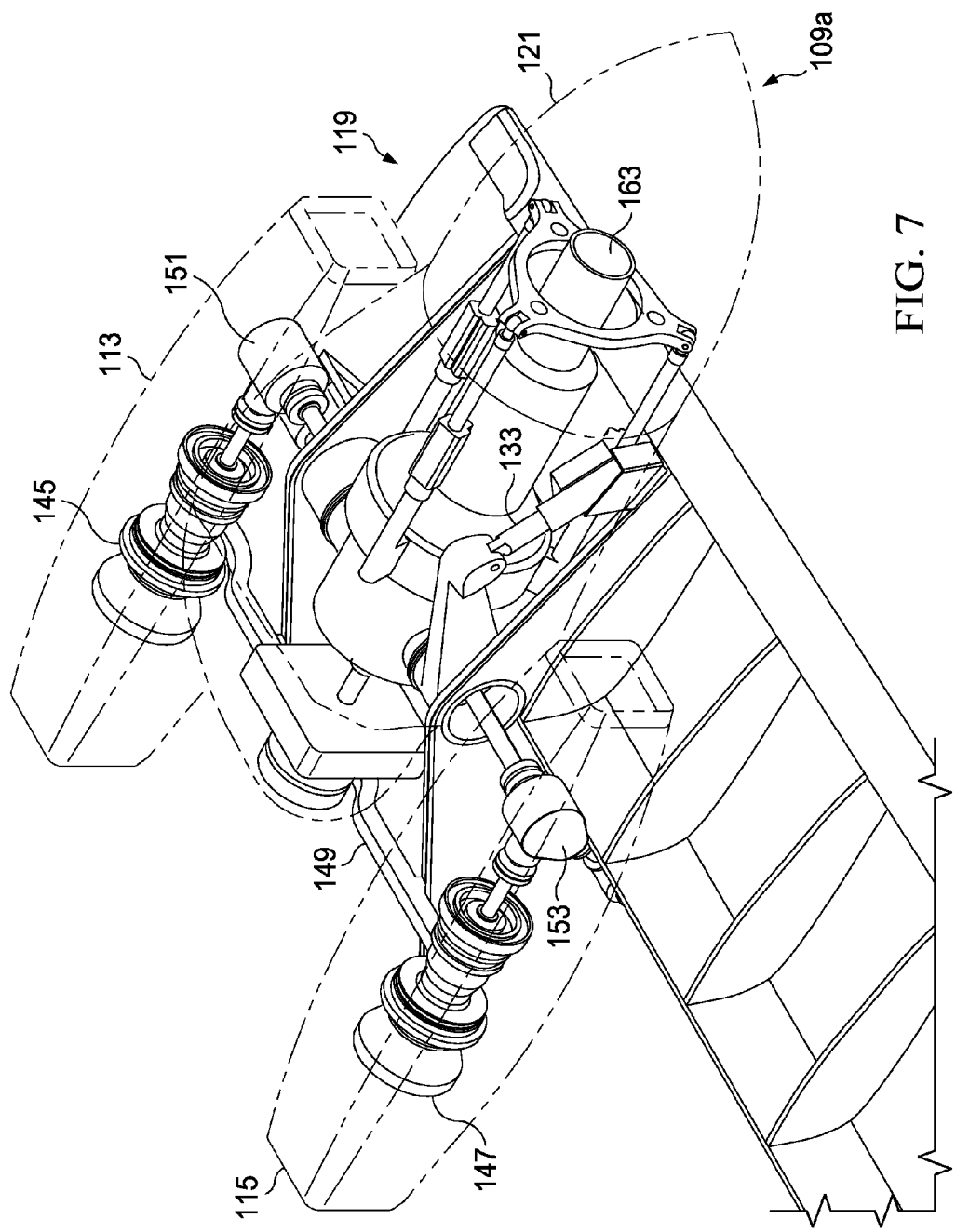
FIG. 7 is a partial perspective view of the rotor system, according to the preferred embodiment of the present application.

Referring now to FIGS. 2 and 3, rotor system 109a is illustrated in an airplane mode and a helicopter mode, respectively. Rotor system 109a includes an outboard fixed engine nacelle 113 and an inboard fixed engine nacelle 115. A prop-rotor pylon 119 includes a plurality of rotor blades 111a (shown in FIG. 1) coupled to internal rotor structure located within an aerodynamic spinner fairing 121. Prop-rotor pylon 119 includes a nacelle fairing 123 that is configured to rotate along with other rotatable pylon structure. Rotor system 109a can include a moveable fairing panel 125 that can be actuated in the aft direction in order to provide rotational clearance for nacelle fairing 123 when prop-rotor pylon 119 is actuated into helicopter mode. Further, moveable fairing panel 125 is actuated forward when prop-rotor pylon 119 is actuated into airplane mode so as to improve aerodynamic airflow about the aft portion of prop-rotor pylon 119. Moveable fairing panel 125 can be actuated with an independent actuator, or can be mechanically coupled to the actuator system used for actuating prop-rotor pylon 119 between airplane mode and helicopter mode.

Prop-rotor pylon 119 is rotatable between the airplane mode, in which prop-rotor pylon 119 is positioned approximately horizontal (as shown in FIG. 2), and a helicopter mode (as shown in FIG. 3), in which prop-rotor pylon 119 is positioned approximately vertical. During the airplane mode, vertical lift is primarily supplied by the airfoil profile of wing member 105, while rotor blades 111a and 111b in each prop-rotor pylon 119 provide forward thrust. During the helicopter mode, vertical lift is primarily supplied by the thrust of rotor blades 111a and 111b in each prop-rotor pylon 119. It should be appreciated that tilt rotor aircraft 101 may be operated such that prop-rotor pylons 119 are selectively positioned between airplane mode and helicopter mode, which can be referred to as a conversion mode.

Rotor system 109a can include a pylon downstop 127 for securing prop-rotor pylon 119 when prop-rotor pylon 119 is positioned in the airplane mode. Further, pylon downstop 127 can be beneficial for relieving stresses on the actuator(s), such as a conversion actuator 133, used for selectively rotating prop-rotor pylon 119 between airplane mode position and helicopter mode position.

Outboard fixed engine nacelle 113 includes an outboard engine air inlet 114. Similarly, inboard fixed engine nacelle 115 includes an inboard engine air inlet 116. Air inlets 114 and 116 can be positioned aft of a leading edge portion 117 of wing member 105; however, an alternative embodiment can include the positioning of air inlets 114 and 116 forward of leading edge portion 117 of wing member 105. The exact position of air inlets 114 and 116 is implementation specific and dependent in part upon the aerodynamic ram air effects that can be achieved through selective placement.

It should be appreciated that the wing tip portion of wing member 105 can be lengthened to customize an aspect ratio of wing member 105 in accordance with implementation specific aerodynamic lift requirements. As such, it should be understood that even though outboard fixed engine nacelle 113 is illustrated approximately abutting the wing tip portion of wing member 105, an alternative embodiment may include the wing tip portion extending well beyond outboard fixed engine nacelle 113.

When rotor system 109a is in helicopter mode, airflow downwash from rotor blades 111a and 111b can flow, when uninhibited, along the upper surface of wing member 105, thereby negatively affecting vertical lift performance. Inboard fixed engine nacelle 115 is located in part to act as an air dam to thwart downwash airflow along the upper surface of wing member 105, the downwash airflow being in the direction from the root end to the tip end of wing member 105.

Referring now also to FIGS. 4-7, rotor system 109a is illustrated in further detail. A swashplate 129 is coupled rotor blades 111a via a plurality of pitch links (not shown). Swashplate actuators 131a-131c are configured to selectively actuate swashplate 129, thereby selectively changing the pitch of rotor blades 111a so as to affect thrust, lift, and direction of aircraft 101 during operation. For example, swashplate 129 can be selectively tilted to effect cyclic pitch change of rotor blades 111a. Further, swashplate 129 can be actuated to effect collective pitch change of rotor blades 111a. A conversion actuator 133 is configured to selectively actuate prop-rotor pylon 119 between a helicopter mode position and an airplane mode position, while the engines 145 and 147 remain fixed on wing member 105. It should be appreciated that conversion actuator 133 may be of a variety of configurations. For example, conversion actuator 133 may be a linear actuator or a rotary actuator, the exact actuator type being implementation specific. A prop-rotor gearbox housing 143 of prop-rotor pylon 119 is pivotally mounted on an outboard rib bearing 139 within an outboard rib 135, and an inboard rib bearing 141 within an inboard rib 137.

An outboard engine 145 and an inboard engine 147 can be structurally mounted on an engine support beam 149 near a trailing edge portion of wing member 105. Outboard engine 145 is mechanically coupled to an outboard input gearbox 151, via an outboard input driveshaft 155, such that torque is transferred to outboard input gearbox 151 from outboard engine 145. Similarly, inboard engine 147 is mechanically coupled to an inboard input gearbox 153, via an inboard input driveshaft 157, such that torque is transferred to inboard input gearbox 153 from inboard engine 147. Torque is transferred to a main rotor mast 163 from outboard input gearbox 155 and inboard input gearbox via an outboard gearbox driveshaft 159 and an inboard gearbox driveshaft, respectively.

Inboard input gearbox 153 can optionally be coupled to an accessory input gearbox 165 and further an interconnect drive shaft 167. Interconnect drive shaft 167 can be used to drive an auxiliary gearbox located within fuselage 103. In an alternative embodiment, interconnect drive shaft 167 can be sized to carry torque sufficient to drive rotor blades 111b on rotor system 109b, which can provide an additional safety factor in an engine failure situation.

The configuration of rotor system 109a allows engines 145 and 147 to remain fixed on wing member 105, while only prop-rotor pylon 119 rotates to allow aircraft 101 to fly both in a helicopter mode, an airplane mode, and conversion mode. Attempts have been made in prior tilt rotor aircraft configurations to locate fixed engines within a fuselage of the aircraft; however, such a configuration requires an interconnect drive system to carry full engine power out to the wing tip mounted rotor and prop-rotor drive gearboxes, which can degrade safety and reliability of the drive system. In contrast, rotor system 109a is configured such that the engines 145 and 147 are located directed adjacent to prop-rotor pylon 119, so that only a short input shaft system is required to carry full engine power. As such, the short input drive shaft system from each engine to the proprotor pylon provides increased safety, reliability, and efficiency. In the illustrated embodiment, full engine power is carried in input driveshafts 155 and 157, as well as gearbox drive shafts 159 and 161. Further, by having two engines 145 and 147, a factor of safety is realized, thus an interconnect drive shaft configured to carry engine power between rotor systems 109a and 109b is not required. However, having an interconnect drive shaft configured to carry engine power between rotor systems 109a and 109b is an alternative configuration that may be desirable when a significant hedge against multiple engine failure is desired. Furthermore, configuring rotor system 109a with fixed engines, instead of engines that rotate, results in a significant reduction in engine certification costs, complexity, and expense. Furthermore, a rotor system 109a with fixed engines, instead of engines that rotate, can provide a substantial increase in engine options and availabilities, thus contributing to aircraft cost reduction.

Figure 8:
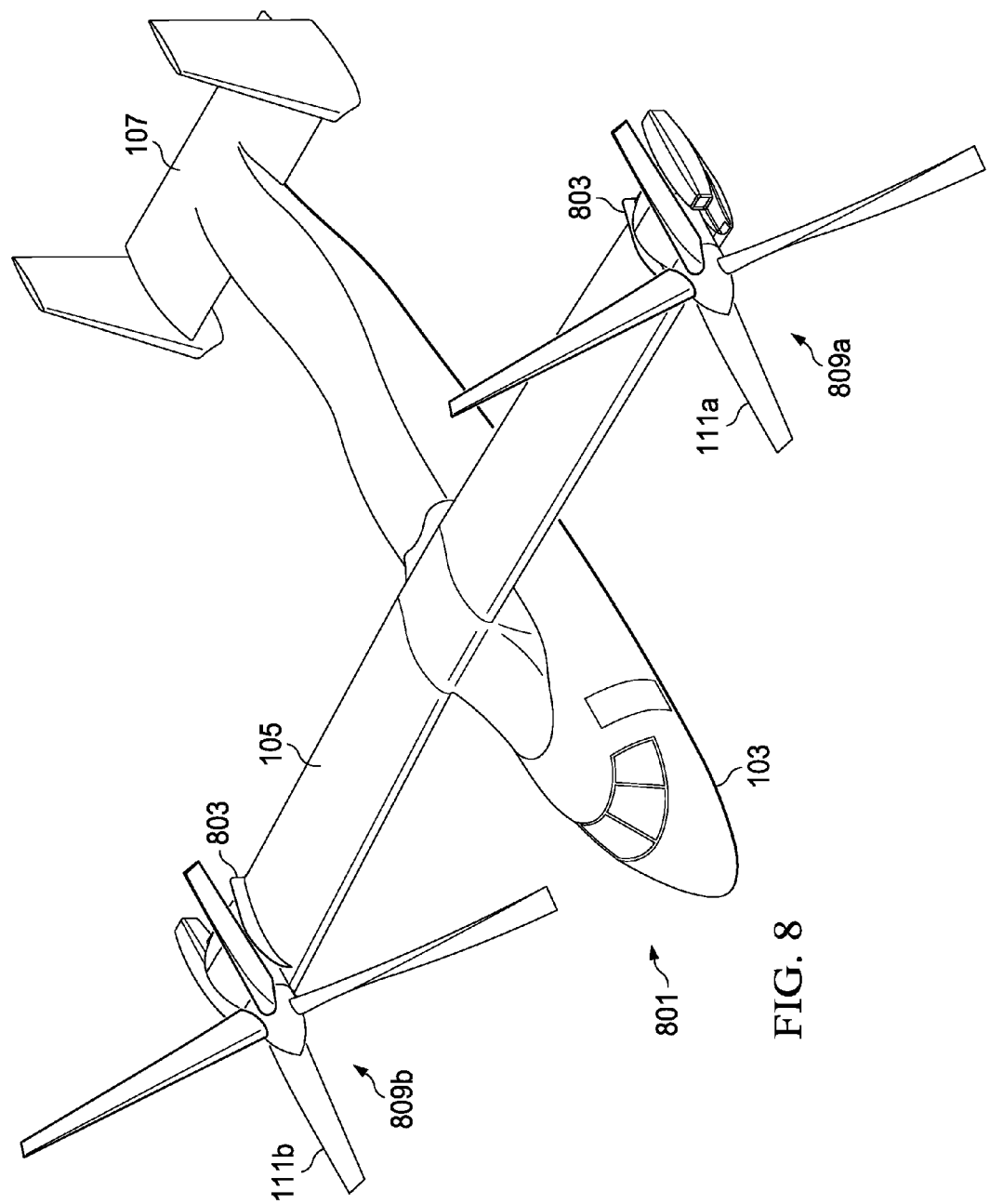
FIG. 8 is a perspective view of a tilt rotor aircraft, according to an alternative embodiment of the present application.
Figure 9:
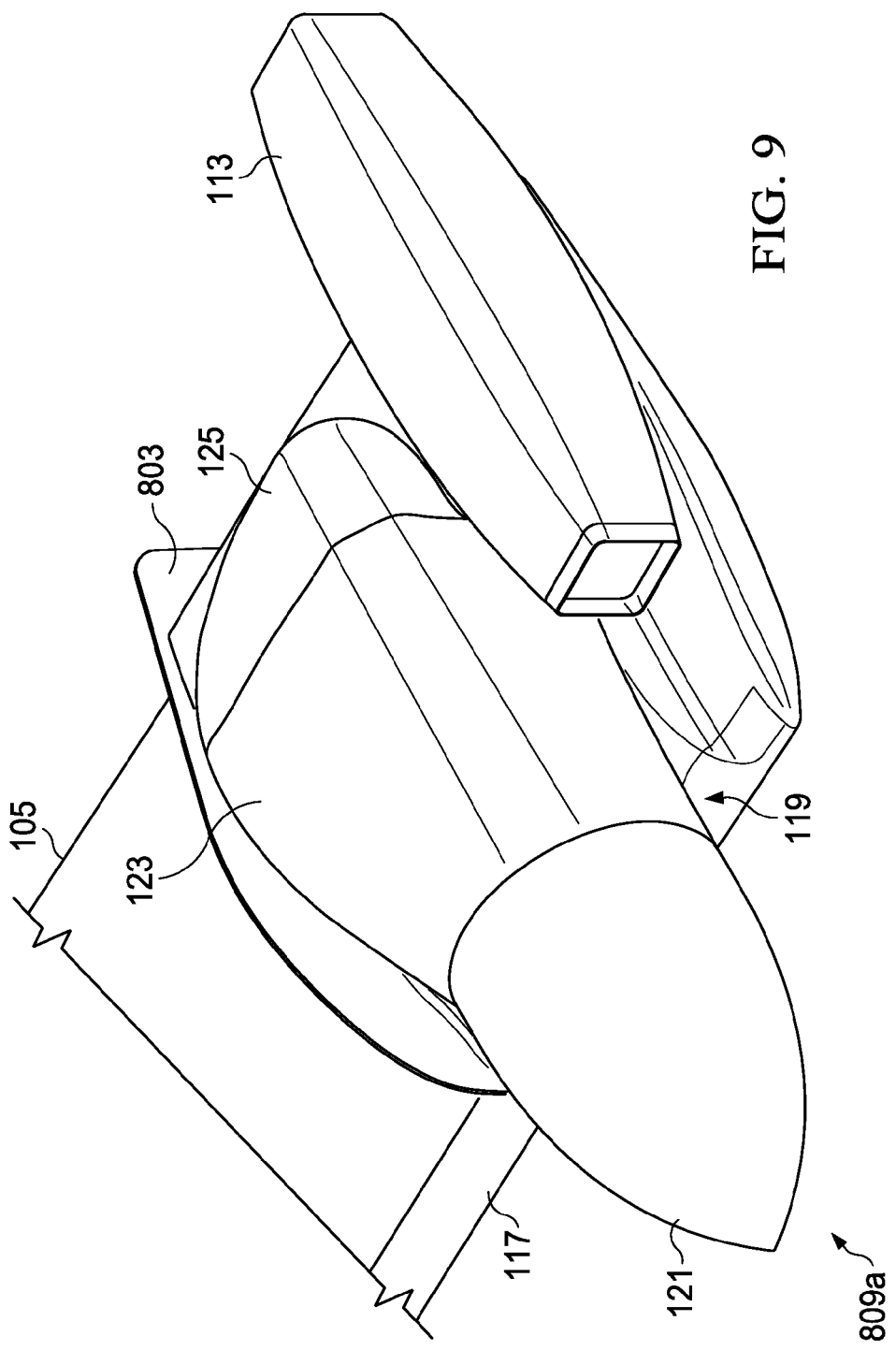
FIG. 9 is a perspective view of the rotor system, according to an alternative embodiment of the present application.
Figure 10:
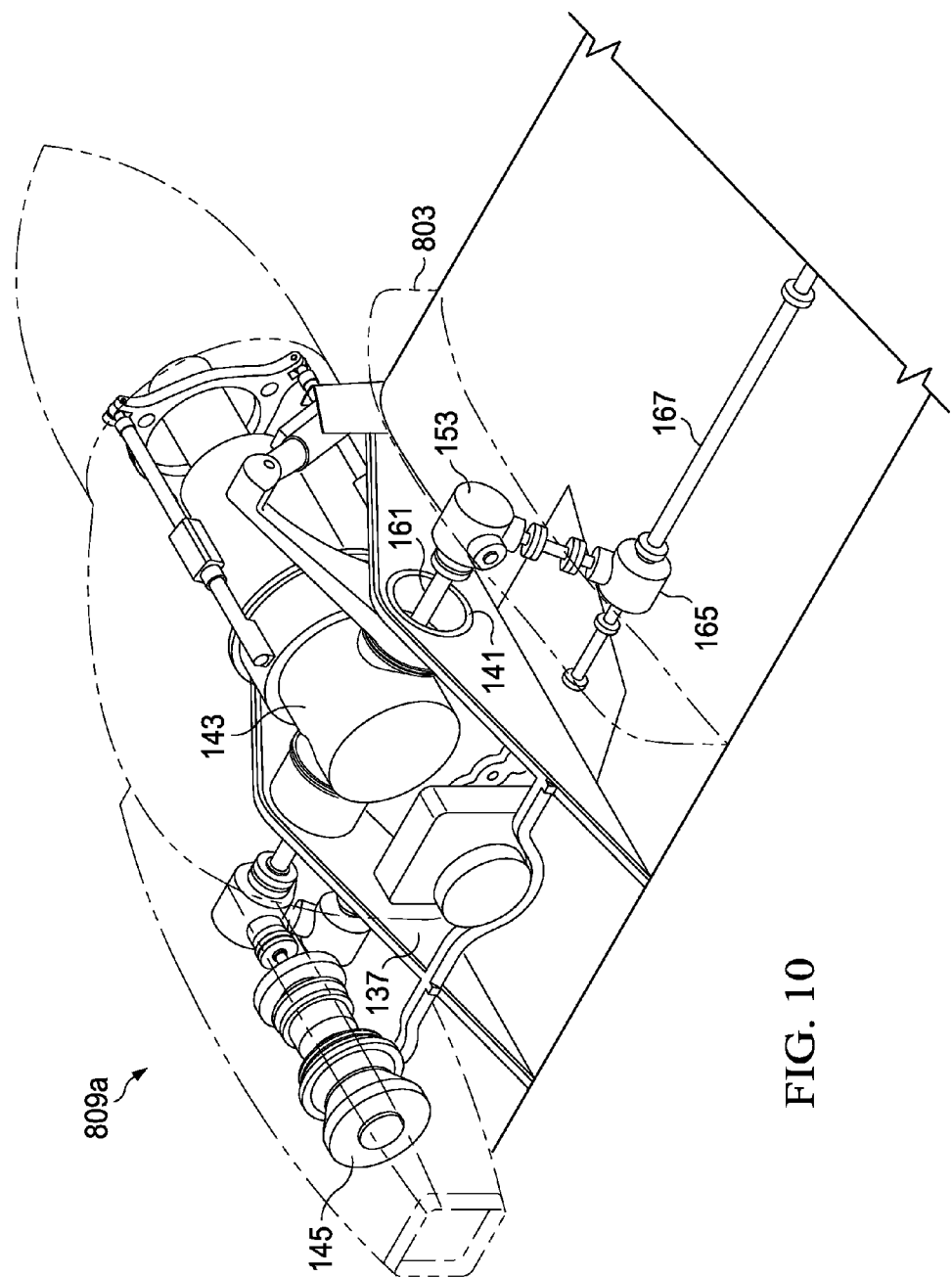
FIG. 10 is a partial perspective view of the rotor system, according to an alternative embodiment of the present application.

Referring now to FIGS. 8-10, a tilt rotor aircraft 801 is illustrated as an alternative embodiment of tilt rotor aircraft 101. Tilt rotor aircraft 801 is substantially similar in form and function to tilt rotor aircraft 801, except as noted herein. For example, tilt rotor aircraft 801 is different from tilt rotor aircraft 101 in that inboard fixed engine nacelle 115 is omitted in rotor systems 809a and 809b. As such, tilt rotor aircraft 801 has only a single fixed engine in each rotor system 809a and 809b. Further, an optional wing fence 803 can be utilized to act as an air dam to thwart downwash airflow along the upper surface of wing member 105, the downwash airflow being in the direction from the root end to the tip end of wing member 105. While tilt rotor aircraft 801 has only a single engine 145 for powering prop-rotor pylon 119, it can be especially desirable for interconnect drive shaft 167 to be sized to carry torque sufficient to drive rotor blades 111b on rotor system 809b, which can provide an additional safety factor in an engine failure situation. In the illustrated embodiment, inboard input gearbox 153 mechanically transmits power from outboard engine 145 to accessory input gearbox 165 and further to interconnect drive shaft 167. It should be understood that the exact configuration of the drive shafts and gearboxes is implementation specific.

It is apparent that a rotor system with significant advantages has been described and illustrated. The tilt rotor fixed engine system provides for a horizontal, permanent engine mounting which reduces certification costs, increases available engine choices, and reduces maintenance costs and scheduled maintenance times. The proximity of the fixed engines to the rotating pylon also increases safety with regard to drive shaft failures, bearing lives, and coupling needs. Although the system of the present application is shown in a limited number of forms, it is not limited to just these forms, but is amenable to various changes and modifications without departing from the spirit thereof.

The invention claimed is:

1. A rotor system for a tilt rotor aircraft, the rotor system comprising:
   an outboard engine in a first fixed location on a wing member of the tilt rotor aircraft; and
   a prop-rotor pylon in power communication with the outboard engine, the prop-rotor pylon being configured to selectively rotate between a vertical position and a horizontal position, the prop-rotor pylon comprising a plurality of rotor blades;
   an outboard input drive shaft coupled between the outboard engine and an outboard input gearbox; and
   an outboard gearbox drive shaft being perpendicular and directly connected to the outboard input drive shaft;
   wherein the prop-rotor pylon selectively rotates about the outboard gearbox drive shaft when orienting between the vertical position and the horizontal position.

2. The rotor system according to claim 1, wherein the outboard engine is located outboard of the prop-rotor pylon.

3. The rotor system according to claim 1, the prop-rotor pylon further comprising:
   a swashplate;
   a gearbox; and
   a nacelle fairing configured as an aerodynamic housing for the swashplate and the gearbox.

4. The rotor system according to claim 1, wherein the outboard gearbox drive shaft traverses through an interior of an outboard rib bearing, the outboard rib bearing providing rotational support for the prop-rotor pylon against a fixed outboard rib member.

5. The rotor system according to claim 1, the prop-rotor pylon further comprising:
   a nacelle fairing configured as an aerodynamic housing for internal components located therein;
   a fairing panel located aft of the nacelle fairing, the fairing panel being moveable between a closed position and an open position, the closed position providing aerodynamic efficiency when the prop-rotor pylon is the horizontal position, the open position providing clearance for the prop-rotor pylon to rotate into the vertical position.

6. The rotor system according to claim 1, further comprising:
   an inboard engine in a second fixed location on the wing member of the tilt rotor aircraft.

7. The rotor system according to claim 6, further comprising:
   an inboard input drive shaft coupled between the inboard engine and an inboard input gearbox; and
   an inboard gearbox drive shaft coupled between the inboard input gearbox and a gearbox located in the prop-rotor pylon.

8. The rotor system according to claim 7, further comprising:
   an accessory drive shaft coupled between the inboard input gearbox and an accessory input gearbox;
   an interconnect drive shaft coupled to the accessory input gearbox.

9. The rotor system according to claim 8, wherein the interconnect drive shaft is coupled to an accessory gearbox located in a fuselage portion of the aircraft.

10. The rotor system according to claim 8, wherein the interconnect drive shaft is coupled to a gearbox configured for drive a second prop-rotor pylon located on an opposite portion of the wing member.

11. A tilt rotor aircraft comprising:
    a fuselage;
    a wing member;
    an outboard engine in a first fixed location on the wing member of the tilt rotor aircraft; and
    a prop-rotor pylon powered by the outboard engine, the prop-rotor pylon being configured to selectively rotate between a vertical position and a horizontal position, the prop-rotor pylon comprising a plurality of rotor blades;
    an outboard input drive shaft coupled between the outboard engine and an outboard input gearbox; and
    an outboard gearbox drive shaft being perpendicular and directly connected to the outboard input drive shaft;
    wherein the prop-rotor pylon selectively rotates about the outboard gearbox drive shaft when orienting between the vertical position and the horizontal position.

12. The tilt rotor aircraft according to claim 11, wherein the outboard engine is located outboard of the prop-rotor pylon, the outboard engine and the prop-rotor pylon being located on an outboard portion of the wing member, the outboard portion being a selected distance from the fuselage.

13. The tilt rotor aircraft according to claim 11, the prop-rotor pylon further comprising:
    a swashplate;
    a gearbox; and
    a nacelle fairing configured as an aerodynamic housing for the swashplate and the gearbox.

14. The tilt rotor aircraft according to claim 11, wherein the outboard gearbox drive shaft traverses through an interior of an outboard rib bearing, the outboard rib bearing providing rotational support for the prop-rotor pylon against a fixed outboard rib member.

15. The tilt rotor aircraft according to claim 11, the prop-rotor pylon further comprising:
   a nacelle fairing configured as an aerodynamic housing for internal components located therein;
   a fairing panel located aft of the nacelle fairing, the fairing panel being moveable between a closed position and an open position, the closed position providing aerodynamic efficiency when the prop-rotor pylon is the horizontal position, the open position providing clearance for the prop-rotor pylon to rotate into the vertical position.

16. The tilt rotor aircraft according to claim 11, further comprising:
   an inboard engine in a second fixed location on the wing member of the tilt rotor aircraft.

17. The tilt rotor aircraft according to claim 16, further comprising:
   an inboard input drive shaft coupled between the inboard engine and an inboard input gearbox; and
   an inboard gearbox drive shaft coupled between the inboard input gearbox and a gearbox located in the prop-rotor pylon.

18. The tilt rotor aircraft according to claim 11, further comprising:
   a conversion actuator configured to selectively rotate the prop-rotor pylon.

* * * * *